Aug. 20, 1935.  J. G. HOLMSTROM  2,012,010
MOTOR VEHICLE FRAME
Filed Feb. 4, 1933  2 Sheets-Sheet 1
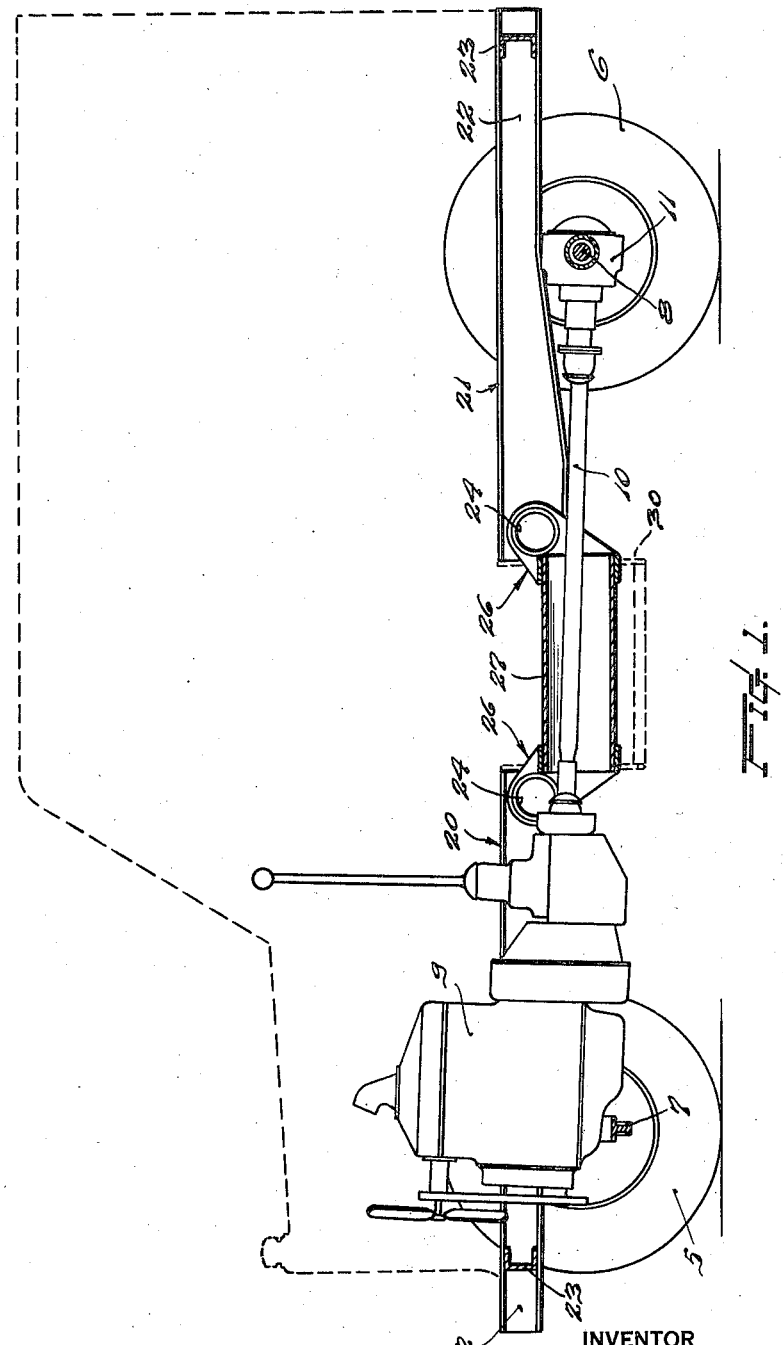

Aug. 20, 1935.   J. G. HOLMSTROM   2,012,010
MOTOR VEHICLE FRAME
Filed Feb. 4, 1933   2 Sheets-Sheet 2
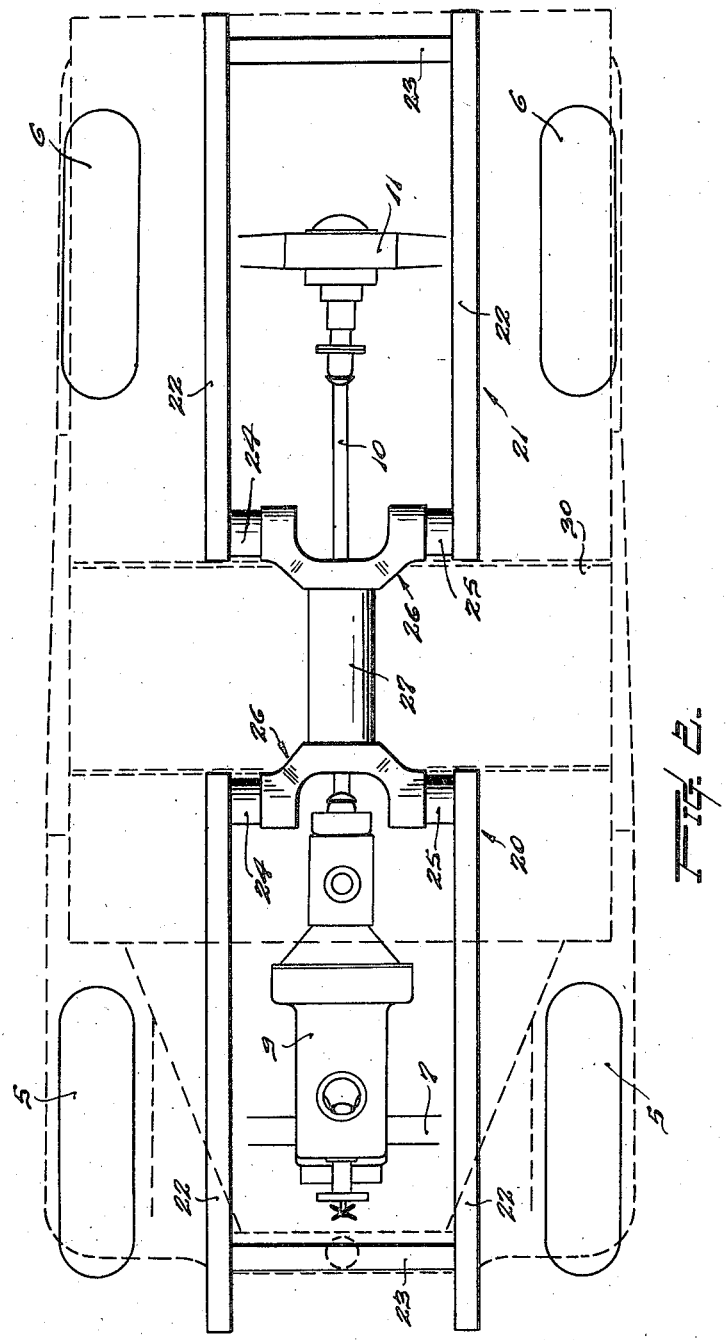
INVENTOR
John G. Holmstrom
BY
ATTORNEY Patented Aug. 20, 1935

2,012,010

UNITED STATES PATENT OFFICE 2,012,010

MOTOR VEHICLE FRAME

John G. Holmstrom, Seattle, Wash., assignor to Kenworth Motor Truck Corporation, Seattle, Wash., a corporation of Washington Application February 4, 1933, Serial No. 655,175

10 Claims. (Cl. 280—2)

This invention relates generally to motor vehicles of the delivery character and has particular reference to the frame therefor. More particularly, the delivery vehicles herein had reference to are of the character utilized for house-to-house deliveries necessitating frequent entry and departure to and from the vehicle by the operator, in the accommodation of which provision is made for a driver's compartment having a floor off-set below the floor level of the vehicle proper, upon which floor the driver is enabled to stand in operating the truck over the delivery route. The present invention is especially directed to the provision of a truck frame peculiarly constructed to more efficiently adapt a vehicle to this character of driver's compartment.

The invention provides a main frame built in two sections between and from which the driver's stand is suspended. It is a major object of the invention to provide means for integrally interconnecting the two sections without in any way interfering with the driver, either as respects entry or departure from the compartment, operation of the vehicle, or handling of the merchandise.

It is a more particular object to provide an interconnecting girder or reach member between the two sections which, being located on the longitudinal center line of the vehicle and accordingly removed from the driver's movements at either side of the vehicle, is disposed above the floor of the compartment in relative proximity of the horizontal plane of the frame sections to materially strengthen the assembly.

It is a further object to construct said reach member in a tubular form to provide a maximum resistance to tension and compression strains.

It is a further object still to accommodate, through the use of said tubular reach member, the passage therethrough of the drive shaft from the motor.

Further and more particular objects and advantages, in addition to the foregoing, will become apparent in the course of the following detailed description and in the claims annexed thereto.

The invention consists in the novel construction, adaptation, and combination of parts hereinafter described and claimed.

In the drawings:—

Figure 1 is a vertical section taken on the longitudinal median line of a truck chassis constructed in accord with the present invention, an outline of the body therefor including the driver's stand being represented by dotted lines; and Fig. 2 is a top plan view of the same in which the body outline is similarly represented.

With reference being had thereto, the numerals 5, 6 respectively indicate the front and rear wheels of the running gear of a delivery vehicle preferably powered by an internal combustion engine 9. 7 represents the front and 8 the rear axle, the latter driven by means of a differential, the housing of which is indicated at 11, from a drive shaft 10. The foregoing, as with spring suspension acting to support the body frame over the front and rear axles, may be of well-known or suitable construction.

More especially as respects said frame for the vehicle which is constructed in two sections, indicated at 20, 21, the side rails 22 and the end brace or cross beams 23 are of conventional channel formation. The present invention has particular reference to the cross bracing and interconnection between the inner adjacent ends of said frame sections.

Relative thereto, riveted, welded, or otherwise secured as a component integral part of the side rails are horizontally aligned companion members 24, 25, preferably tubular, extending transversely of the frame for engagement of their inner ends in transversely-spaced hollows of a U-shaped casting 26. Offset slightly below the plane of said brace-receiving hollows, each of said castings is formed with a longitudinally directed through hollow located medially of the frame width. Said last-named hollows act to receive the two ends of a tubular reach beam 27 for coupling the two frame sections, and, being located on the line of the vehicle drive shaft 10, serve as a housing for the latter. Welding is employed to integrally connect the several parts of the frame-coupling assembly.

As is believed obvious, the driver's stand as indicated by dotted lines at 30 is suspended between the frame sections with its floor extending the entire width of the vehicle body. The depth to which the stand may be slung is limited only by road clearance with the transverse alley formed by the stand being interrupted only in the longitudinal center of the vehicle by the tubular reach 28.

While not illustrated, the invention employs light tubular re-inforcement below the stand, such being supported horizontally between angle-iron or the like depending from the side rails to collectively define the transverse passage-way.

It is my intention, in the foregoing description and in the illustrative showing, to set forth the preferred embodiment of the invention. Numerous modifications, however, may be resorted to and I accordingly limit myself only within the scope of the hereto annexed claims.

What I claim, is:—

1. In a motor vehicle, in combination with the running gear and a drive shaft to the rear wheels of the same, a main frame formed to support a depressed passage extending transversely of the vehicle at the approximate midlength of the frame, a cylindrical tube extending longitudinally through said passage and operating to house said drive shaft, and means rigidly connecting said tubular housing with the frame.

2. In a motor vehicle, the combination with a chassis comprising a main frame formed to accommodate a depressed transverse passage at the approximate midlength of the same extending the width of the frame, a longitudinally extending girder for said frame projected across said passage in relative proximity of the horizontal plane of the frame and on the approximate center line of the frame, and means integrally connecting said girder with the frame, said girder being adapted to embrace the drive shaft, of a body for said vehicle including a floor for the transverse passage, said floor extending below the girder.

3. In a motor vehicle chassis, a main frame formed to accommodate a depressed passage transversely of the same, a girder of a cylindrical form projected across said passage, and means connecting said girder as an integral part with the frame.

4. In a motor vehicle chassis including a main frame formed in two sections for supporting a depressed transverse passage therebetween, means for connecting said sections comprising a longitudinally extending tubular girder projected across said passage on the median line of the frame, and transversely extending braces of a cylindrical form connecting the ends of said girder with the respective sections.

5. In a motor vehicle, in combination with a main frame formed in two sections for supporting a depressed transverse passage therebetween, said sections each comprising side rails and cross braces at opposite ends connecting said side rails, a longitudinally extending girder projected in relative proximity of the horizontal plane of the frame across said passage on the median line of the vehicle for connecting the frame sections together.

6. In a motor vehicle chassis, the combination of a main frame formed in two sections for supporting a depressed transverse passage therebetween, each of said sections including companion transversely aligned brace members at inner ends, a casting connecting the adjacent ends of the companion aligned brace members, and a tubular girder projected across said passage on the longitudinal median plane of the frame and integrally connected with said castings for coupling the sections together.

7. In a motor vehicle chassis, the combination of a main frame formed in two sections for supporting a depressed transverse passage therebetween, each of said sections having tubular cross bracing across inner adjacent ends of the sections, and a tubular girder projected across said passage on the longitudinal median line of the frame and rigidly connected with said cross bracing for coupling the sections together.

8. The structure as defined in claim 7, said coupling girder being offset below the horizontal plane of the frame to encompass the bounds of vibratory oscillation of the drive shaft to act as a housing therefor.

9. In a motor vehicle, in combination, a frame formed to provide a transversely extending passage at the approximate midlength thereof, a vehicle body including a floor extending the width of said passage and located below the horizontal plane of the vehicle drive shaft for supporting the vehicle operator, and means comprising a tubular girder projecting the length of the passage and disposed above the floor for housing the drive shaft, said disposition of the housing above the floor allowing projection of a stream of water through the passage for washing the same.

10. In a motor vehicle, the combination with a frame formed in two separate sections to accommodate a depressed transverse passage for the operator between the same, the drive shaft from the motor extending longitudinally of the frame through said passage, means for connecting the sections as an integral unit comprising a girder arrangement of a substantial H-formation including a cylindrical center member operating as a housing for the drive shaft.

JOHN G. HOLMSTROM.